J. CZECHOWICZ.
TROLLEY HARP.
APPLICATION FILED AUG. 19, 1918.
1,356,045.
Patented Oct. 19, 1920.
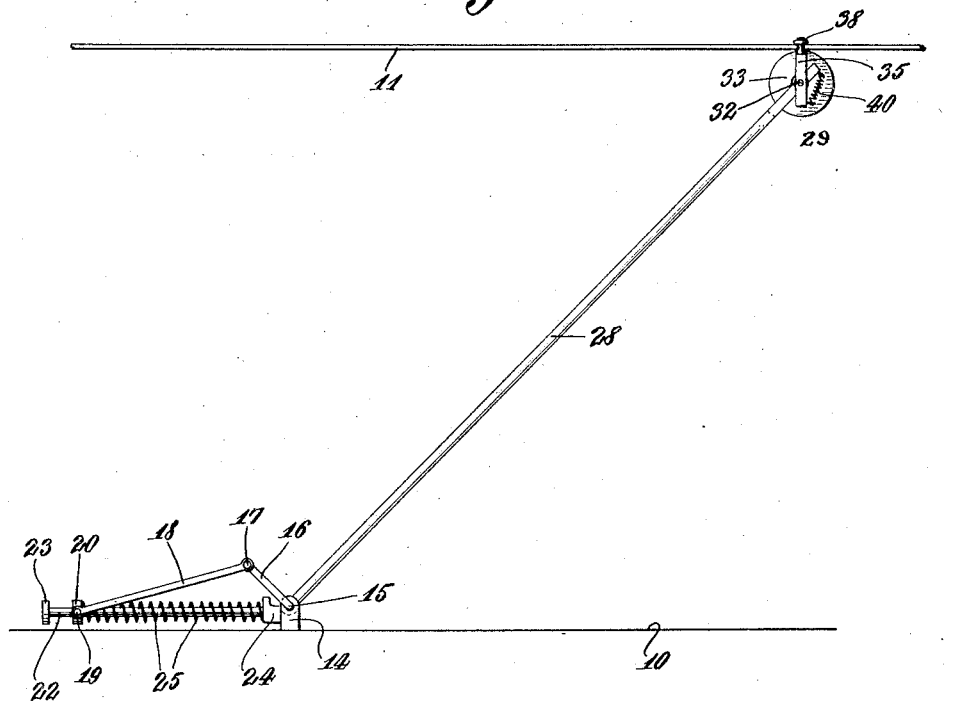
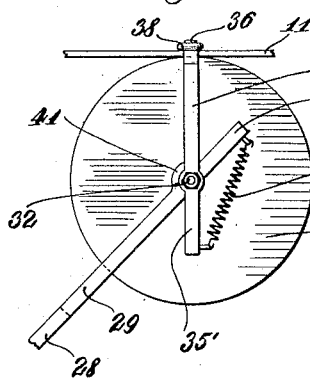
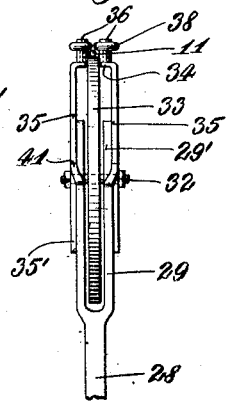
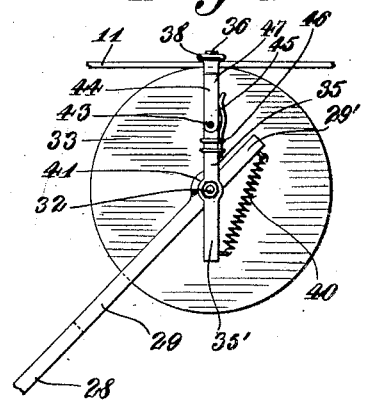
Inventor
Jacob Czechowicz.
By his Attorney

UNITED STATES PATENT OFFICE.

JACOB CZECHOWICZ, OF TERRE HAUTE, INDIANA.

TROLLEY-HARP.

1,356,045.   Specification of Letters Patent.   Patented Oct. 19, 1920.

Application filed August 19, 1918. Serial No. 250,564.

*To all whom it may concern:*

Be it known that I, JACOB CZECHOWICZ, a citizen of Poland, residing at Terre Houte, county of Vigo, and State of Indiana, have invented certain new and useful Improvements in Trolley-Harps, of which the following is a specification.

This invention relates to improvements in the connections between trolleys and trolley wires with which they are engaged.

The principal object of the invention is to provide a device which will maintain a rolling contact between the trolley wheel and the trolley wire.

A further object is to provide means whereby the supporting trolley wheel is held under tension, and finally, to provide engaging means for the trolley wire which ordinarily prevent the trolley wheel from separating therefrom.

These and other like objects, which will become evident as the description progresses, are attained by the novel construction and combination of parts hereinafter described and shown in the accompanying drawing, forming a material part of the disclosure, and in which:—

Figure 1 is a side elevational view of a trolley harp support made in accordance with the invention.

Fig. 2 is an enlarged side view of the trolley wheel and its support.

Fig. 3 is a front view of the same, and

Fig. 4 is a side elevational view showing a modified form of the trolley wheel guide.

In the drawings the numeral 10 represents the roof or upper surface of a car and 11 the trolley wire for conveying a high powered current.

Two lugs 14 are secured on the roof of the car 10 and pivotally mounted in them is a spindle 15, from each end of which extends a relatively short crank arm 16 connected by the pin 17 to a pair of links 18, pivoted by the pins 19 to a collar 20 slidably engaged upon a rod 22 provided on the outer end with a stop collar 23 and fixed at its inner end in a block 24 extending from the lugs 14.

Encircling the rod 22 is a coiled compression spring 25, its inner end pressing against the block 24 and its outer end against the sliding collar 20, moving the same normally outward so as to draw the short levers 16 downward.

A pole 28 is also firmly secured to the spindle 15 so as to form a right angle with the lever arms 16, the pole terminating at its upper end in a fork 29 and passing through the arms of the fork, is a bolt 32 upon which the trolley wheel 33 is rotatably mounted, the wheel having a flat face and being held between the arms of the fork in the ordinary manner.

Also engaged by the bolt 32 are two arms 35, having angular, inturned upper ends 34 carrying fixed vertical pins 36 upon which are mounted rollers 38, the same being arranged in parallel and adapted to contact with the trolley wire 11 upon opposite sides thereof engaging the trolley wire with the trolley wheel 33.

The opposite ends of the arms 35 extend downwardly below the bolt 32, the extensions 35' having secured to them the ends of coiled tension springs 40 attached at their opposite ends to the extensions 29' of the forks 29, the effect of the springs being to neutralize the friction of the rollers 38 in contact with the trolley wire 11 and hold the arms 35 rigidly against lugs 41 formed with the fork 29.

In the modification shown in Fig. 4, the same general construction is maintained, except that the arms 35 are reduced in length and engaged by pivots 43 are extensions 44 having inturned ends 47 carrying the pins 36 and roller 38, said extensions being held in register with the arms, attached by springs 45 secured to the extensions 35 by clips 46, and when the arms are pushed back by some obstructions, after this is passed, they will return to their normal position.

From the foregoing it will be seen that the trolley wheel is held in contact with the trolley wire, the rollers being so arranged as to prevent separation.

Having thus described my invention what I claim is new and desire to secure by Letters Patent, is:—

In a trolley wheel support, the combination with an angularly mounted pole and a trolley wire, of a flat faced wheel rotatably engaged at the end of said pole, arms pivoted on the extending ends of said pole, means preventing movement of said arms in one direction, extensions pivoted to said arms, and a pair of rollers pivoted axially and vertically in the ends of said extensions, said rollers being adapted to laterally contact with said trolley wire and maintain it in contact with the face of said wheel, springs for holding said arms in register with said extensions, and clips for securing said springs to said extensions.

In testimony whereof I have affixed my signature.

JACOB CZECHOWICZ.